United States Patent [19]

Takahashi

[11] Patent Number: 4,890,875

[45] Date of Patent: Jan. 2, 1990

[54] SUN VISOR FOR AUTOMOBILE

[76] Inventor: Taneyuki Takahashi, 34-9, Koshigoe 2-Chome, Kamakura-Shi, Kanagawa, Japan

[21] Appl. No.: 832,882

[22] Filed: Feb. 26, 1986

[30] Foreign Application Priority Data

May 16, 1985 [JP] Japan .............................. 60-72457[U]
May 16, 1985 [JP] Japan .............................. 60-72485[U]

[51] Int. Cl.$^4$ ................................................ B60J 3/02
[52] U.S. Cl. .................................... 296/97.2; 296/97.1
[58] Field of Search .................. 296/97 R, 97 F, 97 H, 296/97 C

[56] References Cited

U.S. PATENT DOCUMENTS

| | | | |
|---|---|---|---|
| 1,459,322 | 6/1923 | Davitt | 296/97 F |
| 1,589,475 | 6/1926 | Lowther | 296/97 F |
| 1,597,084 | 8/1926 | Lowther | 296/97 F |
| 1,990,222 | 2/1935 | Burlein | 296/97 F |
| 2,160,504 | 5/1939 | Jacobs | 296/97 H |
| 3,242,245 | 3/1966 | Greig et al. | 296/97 H |

FOREIGN PATENT DOCUMENTS 2120615 12/1983 United Kingdom .............. 296/97 C

Primary Examiner—Margaret A. Focarino
Assistant Examiner—Frank H. Williams, Jr.
Attorney, Agent, or Firm—James E. Nilles

[57] ABSTRACT

A sun visor for use in an automobile wherein a transparent sheet having a suface on which a translucent sheet is attached is used, and the marginal portion of the sheet is supported by a supporting frame. The translucent sheet is a thin film made by vacuum depositing metal such as aluminum or nonmetal such as arsenic and phosphorous, or is formed by reticulated patterns forming fine through holes. The transparent sheet is provided along its peripheral edge with engagement holes. The supporting frame is split into two upper and lower sections and one of the split sections of the supporting frame has pegs and the other apertures, the pegs being mated through the engagement holes with the apertures.

5 Claims, 4 Drawing Sheets

SUN VISOR FOR AUTOMOBILE

BACKGROUND OF THE INVENTION

1. Field of the Invention

The present invention relates to a sun visor for use in an automobile which is disposed at the front of the compartment of a car, i.e., above the windshield located in front of the driver's and passenger's seats, and which is lowered when the sun streams into the compartment from the front end thereof so as to shield the driver's eyes from direct sunlight, as well as those of the passenger seated at his side.

2. Description of the Prior Art

A known automobile sun visor of this type is designed to shut out the sun's rays when they are shining into the compartment of a vehicle from the front, and is composed of a supporting frame made of steel wire or the like with a curved configuration and either cloth or a thin opaque sheet of synthetic resin such as vinyl chloride. The supporting frame is covered with the thin sheet or cloth so that the frame is entirely surrounded thereby, and the driver or the passenger is thus unable to see through the sun visor at all.

The above-mentioned known sun visor for an automobile reduces substantially by half visibility in the direction of travel when it is lowered so as to screen sunlight shining through the front windshield of a vehicle, thereby making it difficult for the driver or the passenger to look through the windshield.

In consequence, when the known sun visor is used so as to shut out sunlight, it becomes both difficult and dangerous to drive a car. Also, such a sun visor causes the driver to easily become tired.

SUMMARY OF THE INVENTION

In view of the above-mentioned disadvantages, it is a primary object of the present invention to provide an automobile sun visor which comprises a translucent screen sheet, the sheet being made of a transparent synthetic resin sheet which is modified by vacuum-depositing metal such as aluminum or nonmetal such as arsenic and phosphorous and thereby creating a thin film of the deposited material on the surface of the transparent sheet which enables a forward view therethrough, and a frame over which the sheet is extended, the frame being mounted on a car body by securing one end thereof to a mounting member of the body in such a manner that the sun visor can be swung upwardly and downwardly.

It is another object of the present invention to provide an automobile sun visor which comprises a transparent synthetic resin sheet having thereon a translucent film which enables a forward view therethrough in its central portion, and a supporting frame molded of synthetic resin, the transparent sheet having a peripheral portion which is attached along the synthetic resin supporting frame and bonded thereto when the frame is molded, the frame being mounted on a car body by fixing one end thereof to a mounting member of the body in such a manner that it can be swung upwardly and downwardly.

When the automobile sun visor of the present invention is lowered by being swung downwardly when the sun's rays stream into a car from the front end thereof, it is capable of shutting out the greater part of the direct sunlight entering the compartment of the vehicle from the front, just as the conventional sun shade does, and the driver and the passenger seated at his side are not dazzled by the glare of the light.

On the other hand, the sun visor of the present invention also makes it possible for the driver and the passenger to have a forward view through a thin film mounted on the surface of the transparent sheet or through a large number of particles deposited on the transparent sheet.

The above and other objects and features of the present invention will be apparent from the following description, reference being made to the accompanying drawings wherein preferred embodiments of the present invention are clearly shown.

DESCRIPTION OF THE PREFERRED EMBODIMENTS

Figure 1:
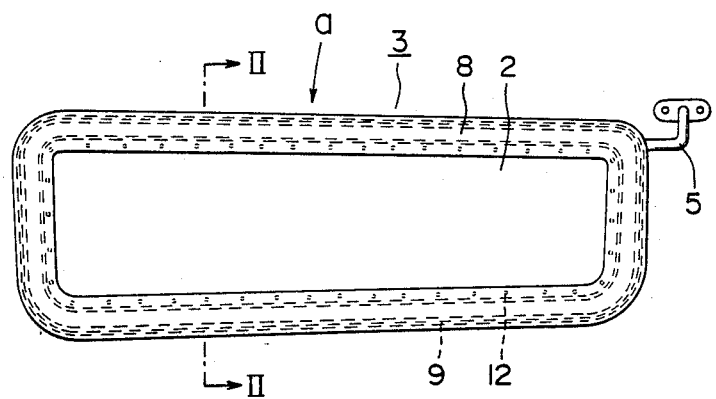
FIG. 1 is a rear view of an embodiment of an automobile sun visor according to the present invention.

In a first embodiment, a screen sheet 2 is made of a transparent synthetic resin sheet such as polyester which is modified by placing the sheet of polyester or other transparent synthetic resin and a plate of aluminum or other metal in a vacuum in such a manner that they are opposed to each other and by applying an electric charge to the metal plate, thereby depositing metal particles on one or both surfaces of the transparent synthetic resin sheet at a rate which enables the sheet to be seen through and creates a thin film 1 of the metal particles. The translucence of the screen sheet 2 may alternatively be provided by forming a thin film 1 of a nonmetal such as arsenic or phosphorus.

A large number of engagement holes are provided at the peripheral portion of the screen sheet 2 in such a manner that they are spaced apart at adequate intervals. The peripheral edge of the sheet 2 is wound around an edging frame 6 made of steel wire.

A supporting frame 3 which is split into an upper and lower frame sections 7, 8 is made of a synthetic resin material. A thermosetting or thermoplastic resin, or such resin mixed with wood fiber, wood flour, talc or the like, is mixed with reinforcing resin or inorganic reinforcement such as to provide further reinforcement of the frame, and is then molded into a frame.

The cross-sectional configurations of the upper and lower frame sections 7, 8 are in the shape of an inverted "U" and a "U", respectively, and are disposed in opposition to each other. An annular tongue 9 is provided on the downwardly facing surface of the outer portion of the upper frame section 7 along the line passing the center of the outer portion, while a large number of apertures 10 are provided in the downwardly facing surface of the inner portion along the line passing the center of the inner portion in such a manner that they are spaced apart at the same intervals as those of the engagement holes provided on the screen sheet 2. On the other hand, an annular groove 11 is provided on the upwardly facing surface of the outer portion of the lower frame section 8 along the center line thereof, while a large number of pegs 12 are provided on the upwardly facing surface of the inner portion along the center line thereof in such a manner that they are spaced apart at the same intervals as those of the engagement holes 10 provided in the screen sheet 2.

Figure 2:
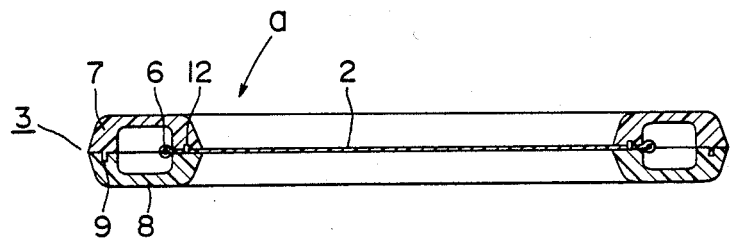
FIG. 2 is a sectional view taken along the line II-II of FIG. 1.
Figure 3:
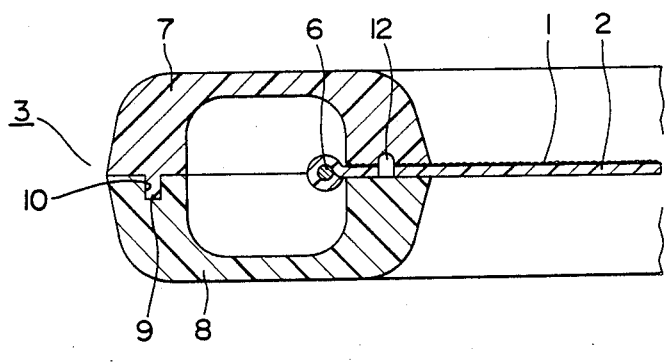
FIG. 3 is an enlarged side and sectional view of a part of the sun visor shown in FIG. 2.
Figure 4:
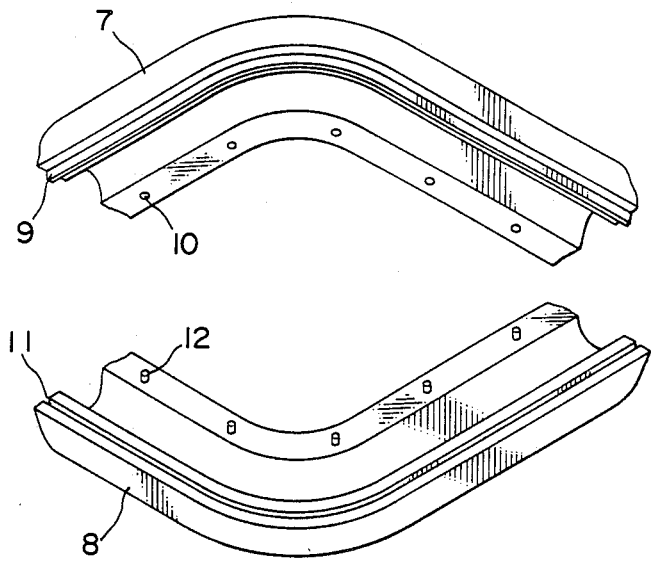
FIG. 4 is an exploded perspective view of a part of the supporting frame.

As shown in FIG. 2, the engagement holes provided in the peripheral portion of the screen sheet 2 are mated with the pegs 12 on the lower frame section 8, and the peripheral edge of the sheet 2 with the edging frame 6 provided thereof is positioned within the recess of the lower frame section 8, thereby placing the screen sheet 2 on the lower frame section 8. Then, the upper frame section 7 is placed on the lower frame section 8 by mating the annular tongue 9 and the large number of apertures 10 in the upper frame section 7 with the annular groove 11 and the large number of pegs 12 of the lower frame section 8, respectively. The upper and lower frame sections 7, 8 are then secured to each other by an adhesive, thus extending the screen sheet 2 within the supporting frame 3 comprising the frame sections 7, 8 such as to construct a sun visor a.

Subsequently, one end of the supporting frame 3 of the sun visor a is mounted to a member 5 in such a manner that it can be swung upwardly and downwardly.

Figure 5:
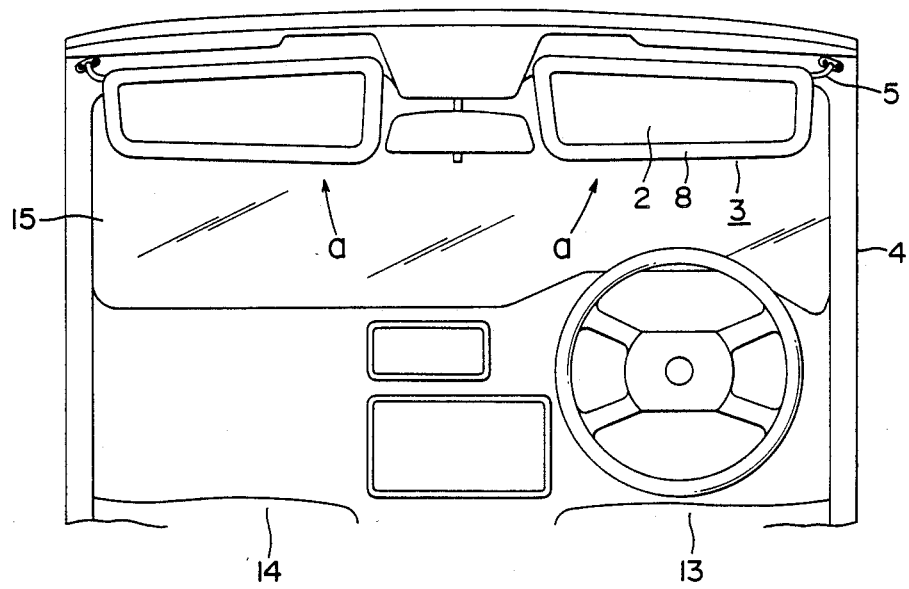
FIG. 5 is a rear view showing the above-described sun visor mounted on an automobile.
Figure 6:
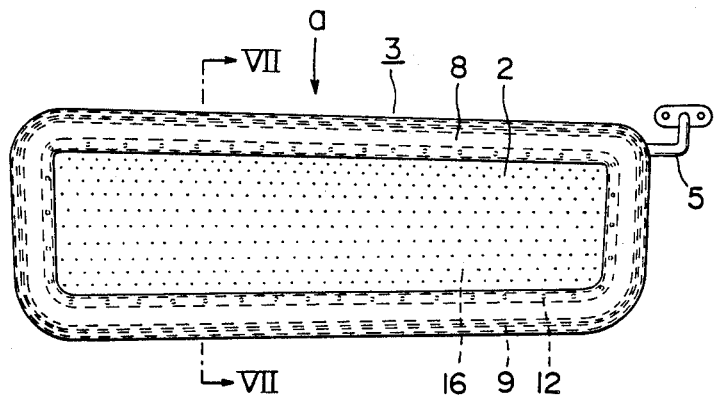
FIG. 6 is a rear view of another embodiment of an automobile sun visor according to the present invention.
Figure 7:
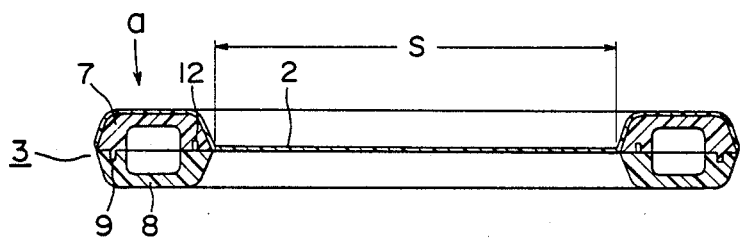
FIG. 7 is a sectional view taken along the line VII—VII of FIG. 6.
Figure 8:
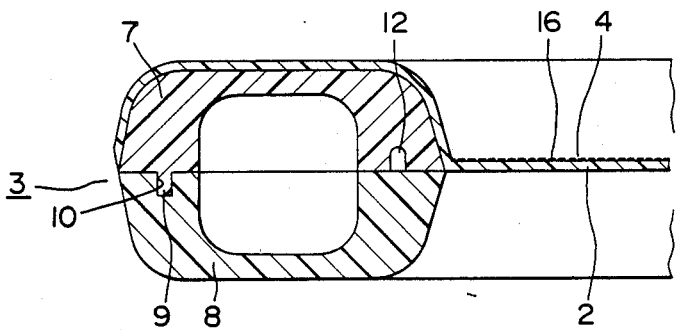
FIG. 8 is an enlarged side and sectional view of a part of the sun visor shown in FIG. 7.
Figure 9:
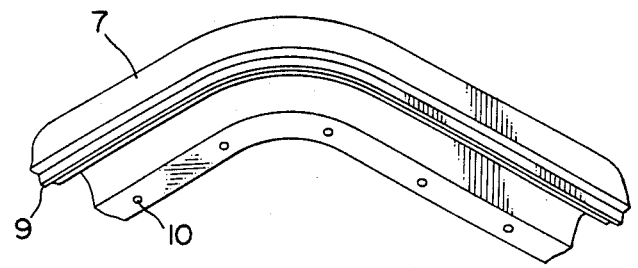
FIG. 9 is an exploded perspective view of parts of the upper and lower frame sections.
Figure 10A:
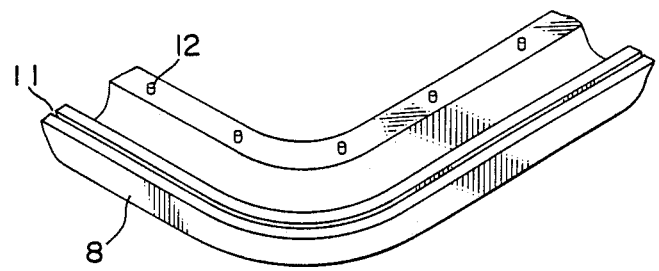
FIGS. 10 (A) to 10 (C) are side and sectional views of a sun visor of the second embodiment, showing its manufacturing process in an explanatory manner.
Figure 10B:
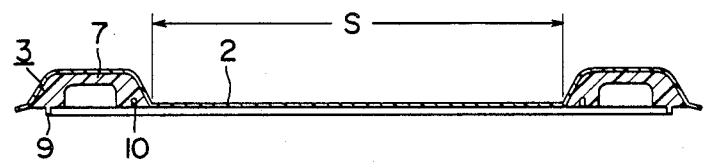
Figure 10C:
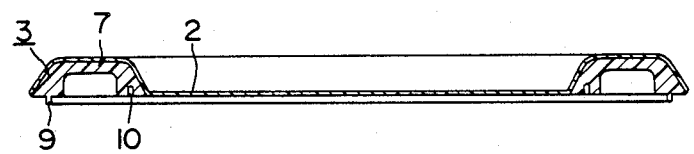
Figure 10C:
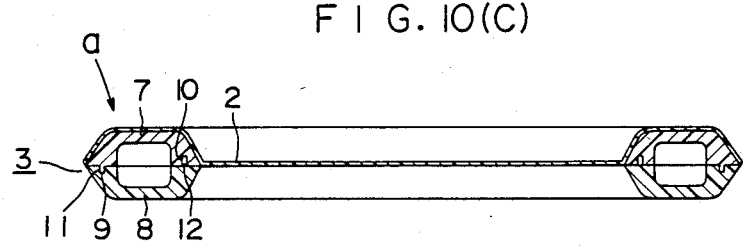

The reference numerals 13 and 14 in FIG. 5 designate a driver's seat and a passenger's seat located at the front end of a car, respectively. The reference numeral 15 denotes a windshield.

FIGS. 6 to 9 show another embodiment of the present invention. As shown in Figures, reticulated patterns 16 are printed in black or in other color on the transparent synthetic resin sheet such as to make it partly opaque. The printing is provided on the sheet 2, especially on the central portion thereof which will act as a large number of fine through holes provided in the portion S of the sheet 2 which corresponds to the central portion of the sheet within the synthetic resin supporting frame 3, thereby forming a large number of fine through holes 4 on the sheet 2. Alternatively, reticulated opaque patterns 16 are printed in a similar manner only on the central portion of the sheet, printing being excluded from the peripheral portion thereof, thereby forming a large number of fine through holes.

Thus, a large number of fine and transparent through holes 4 are formed. The screen sheet 2 of the sun visor a for use in an automobile may also be formed by attaching to a transparent synthetic resin sheet an opaque synthetic resin sheet with a large number of fine through holes 4 provided in the central portion S thereof. Further, when the synthetic resin employed for the frame is molded into the supporting frame 3, (1) as shown in FIG. 10 (A), the peripheral portion of the sheet 2 is attached along the supporting frame 3, and the portion S with the large number of fine through holes 4 provided thereon is pushed into the supporting frame 3, thereby fitting the portion S substantially to the inner edge of the supporting frame 3. The peripheral portion of the sheet 2 is then adhered to the frame 3.

(2) As shown in FIG. 10 (B), the peripheral edge of the sheet 2 which sticks out from the supporting frame 3 is then cut off.

(3) Subsequently, as shown in FIG. 10 (C), the annular tongue 9 on the upper frame section 7 of the supporting frame 3 is mated with the annular groove 11 in the lower frame section 8, while the large number of apertures 10 in the upper frame section 7 are mated with the pegs 12 on the lower frame section 8, and the lower frame section 8 is secured to the upper frame section 7 by an adhesive such as to construct the sun visor a.

Then, one end of the supporting frame 3 of the sun visor a is mounted to a member 5 in such a manner that it an be swung upwardly and downwardly.

With the above-mentioned arrangement, the automobile sun visor of the present invention ensures the following distinct advantages.

(1) It is able to screen the greater part of the direct sunlight entering the compartment of a car from the front of being lowered when the sun's rays stream into the car from the front end thereof, thus preventing the driver and the passenger seated by his side from being blinded by the sunlight.

(2) It is possible for the driver and the passenger to have a forward view through a thin metal or nonmetal film deposited on the surface of the sheet or through the large number of fine through holes provided thereon.

Therefore, even when the sunlight comes into the compartment of a car from the front end thereof during travel, visibility in the direction of travel is ensured to some extent, thus improving driving safety.

(3) The greater part of the sun visor is made from a thin sheet, or has a large number of fine through holes, which enables a good forward view therethrough.

(4) The sun visor is constructed by extending the sheet within the supporting frame, by means of which it is given a durable structure.

(5) The sheet and the supporting frame are assembled together by adhering the sheet to the supporting frame when the supporting frame is formed by molding the synthetic resin material, thereby making the production of the sun visor easy and increasing working efficiency.

(6) With a simple structure, it can be easily produced at a low cost, while at the same time its parts may be firmly fixed to one another.

What is claimed is:

1. A sun visor for an automotive vehicle comprising:
A. a transparent sheet
   (1) having peripheral portions which are adjacent to edges of the sheet and which surround a central portion thereof, and
   (2) having an opaque coating printed on said central portion of said sheet, and opaque coating having a reticulated pattern formed with a number of small holes through which the outside scene can be viewed; and
B. a rigid supporting frame of synthetic resin split into two portions for gripping therebetween the edges of the sheet and surrounding said central portion thereof to maintain said central portion substantially flat and to provide a connection between the sheet and a vehicle structure whereby the sheet is swingable to and from an operative position overlying a windshield;

C. wherein holes are formed through the sheet, at spaced intervals along at least certain of its edges and adjacent to those edges, and wherein one of said portions of the frame has pegs projecting therefrom which extend through said holes and are positively engaged in apertures in the other of said frame portions to positively secure the frame portions to one another and positively engage the pegs of the frame portion with the holes of the sheet.

2. The sun visor of claim 1 wherein said coating is a vacuum deposited film of a material of the class consisting of aluminum, arsenic and phosphorous.

3. The sun visor of claim 1 further characterized by: a substantially rigid narrow edging frame around which said peripheral portions of the transparent sheet are wrapped and which is engaged with said supporting frame substantially all around it to cooperate with it in supporting the transparent sheet.

4. The sun visor of claim 1 wherein each of said portions of the frame overlies its adjacent surface of the sheet so that the edge portions of the sheet are supported between said portions of the frame.

5. The sun visor of claim 1 wherein edge portions of the sheet overlap one of said portions of the frame.

* * * * *